US009605332B2

(12) United States Patent
Kennedy et al.

(10) Patent No.: US 9,605,332 B2
(45) Date of Patent: Mar. 28, 2017

(54) APPARATUS AND METHOD FOR PRIMING A MOLTEN METAL FILTER (71) Applicant: NORWEGIAN UNIVERSITY OF SCIENCE AND TECHNOLOGY (NTNU), Trondheim (NO)

(72) Inventors: Mark William Kennedy, Sjetnemarka (NO); Shahid Akhtar, Trondheim (NO); Robert Fritzsch, Berlin (DE); Jon Arne Bakken, Trondheim (NO); Ragnhild Elisabeth Aune, Stockholm (SE)

(73) Assignee: NORWEIGIAN UNIVERSITY OF SCIENCE AND TECHNOLOGY (NTNU), Trondheim (NO)

( * ) Notice: Subject to any disclaimer, the term of this patent is extended or adjusted under 35 U.S.C. 154(b) by 156 days.

(21) Appl. No.: 14/396,968

(22) PCT Filed: Apr. 25, 2013

(86) PCT No.: PCT/IB2013/000775
§ 371 (c)(1),
(2) Date: Oct. 24, 2014

(87) PCT Pub. No.: WO2013/160754
PCT Pub. Date: Oct. 31, 2013

(65) Prior Publication Data
US 2015/0322543 A1    Nov. 12, 2015

Related U.S. Application Data

(60) Provisional application No. 61/639,196, filed on Apr. 27, 2012.

(51) Int. Cl.
C22B 9/02        (2006.01)
C22B 9/00        (2006.01)
(Continued)

(52) U.S. Cl.
CPC .............. *C22B 9/023* (2013.01); *B01D 37/02* (2013.01); *C22B 9/003* (2013.01); *C22B 21/066* (2013.01); *Y02P 10/234* (2015.11)

(58) Field of Classification Search
CPC ..... C22B 9/023; C22B 21/0066; C22B 9/003; B01D 37/02
See application file for complete search history.

(56) References Cited

U.S. PATENT DOCUMENTS 4,212,592 A    7/1980  Olich et al.
4,331,621 A    5/1982  Brockmeyer
(Continued)

FOREIGN PATENT DOCUMENTS

CN    1317587 A    10/2001
CN    1317588 A    10/2001
(Continued)

OTHER PUBLICATIONS

International Search Report, issued in PCT/IB2013/000775, dated Aug. 28, 2013.
(Continued)

*Primary Examiner* — George Wyszomierski
*Assistant Examiner* — Tima M McGuthry Banks
(74) *Attorney, Agent, or Firm* — Birch, Stewart, Kolasch & Birch, LLP (57) ABSTRACT

An apparatus and method are described for effectively priming a non-electrically conductive filter for removal of solid inclusions from liquid metal. In one embodiment, the ceramic filter media is surrounded by a low frequency induction coil (1-60 Hz) with its axis aligned in the direction of the net metal flow. The coil is positioned to enhance the heating of any metal frozen onto, or in the pores of, the filter element. In one embodiment, the coil is positioned in order to generate Lorentz forces, which act to cause heated metal (Continued)

to impinge on the upper surface of the filter element, enhancing the priming action. Once a filter equipped with such a coil has been primed, it can be kept hot or reheated, and subsequently reused during several batch tapping sequences.

23 Claims, 7 Drawing Sheets

(51) Int. Cl.
  *B01D 37/02* (2006.01)
  *C22B 21/06* (2006.01)

(56) References Cited

U.S. PATENT DOCUMENTS

| | | | |
|---|---|---|---|
| 4,837,385 A | 6/1989 | Conti et al. | |
| 4,872,908 A | 10/1989 | Enright et al. | |
| 4,990,059 A | 2/1991 | James | |
| 7,666,248 B2 | 2/2010 | Belley et al. | |
| 2007/0022841 A1* | 2/2007 | Todaro | B22D 43/004 75/407 |
| 2012/0144958 A1* | 6/2012 | Olson, III | B01D 39/2093 75/412 |

FOREIGN PATENT DOCUMENTS

| | | |
|---|---|---|
| CN | 1354267 A | 6/2002 |
| CN | 101033532 A | 9/2007 |
| CN | 201545895 U | 8/2010 |
| GB | 1 537 548 A | 12/1978 |
| JP | 51-142162 A | 12/1976 |
| JP | 55-86368 A | 6/1980 |
| RU | 2 130 503 C1 | 5/1999 |

OTHER PUBLICATIONS

Kennedy et al., "Electromagnetically Enhanced Filtration of Aluminum Melts", Light Metals 2011 Edited by: Stephen J. Lindsay, TMS (The Minerals, Metals & Materials Society), 2011, pp. 763-768, XP009171468, ISSN: 0147-0809, DOI: 10.1002/9781118061992.CH132 [retrieved on May 2, 2012] the whole document.
English translation of the Chinese Office Action and Search Report, dated Nov. 26, 2015, for Chinese Application No. 201380022066.4.
Kennedy et al., "Electromagnetically Enhanced Filtration of Aluminum Melts", Light Metals, Edited by Stephen J. Lindsay, TMS(The Minerals, Metals & Materials Society), 2011, pp. 763-768.
Kennedy et al., "Electromagnetically Enhanced Filtration of Aluminum Melts", in Light Metals, 2011, pp. 763-768.
Russian Office Action and Search Report, dated Apr. 13, 2016, for Russian Application No. 2014145808/02, with an English translation of the Office Action.
Canadian Office Action dated Jul. 4, 2016, for Canadian Application No. 2,871,245.
European Office Action dated Oct. 12, 2016, for European Patent Application No. 13 728 509.4.
Notice of Reasons for Rejection dated Nov. 8, 2016, for Japanese Application No. 2015-507617 (with English language translation).

* cited by examiner

APPARATUS AND METHOD FOR PRIMING A MOLTEN METAL FILTER

CROSS REFERENCE TO RELATED APPLICATIONS

This application is the National Phase of PCT International Application No. PCT/IB2013/000775, filed on Apr. 25, 2013, which claims priority under 35 U.S.C. 119(e) to U.S. Provisional Application No. 61/639,196, filed on Apr. 27, 2012, all of which are hereby expressly incorporated by reference into the present application.

TECHNICAL FIELD

This invention involves the priming of filters for removal of solid inclusions from liquid metal. Disclosed herein are an apparatus and a method for priming a molten metal filter.

BACKGROUND OF THE INVENTION

Ceramic filters and commonly Ceramic Foam Filters (CFF) are currently available to purify liquid metal, such as disclosed in U.S. Pat. No. 3,893,917. Most often this involves the removal of solid inclusions from liquid metal, such as steel and aluminum. These solid inclusions can lead to physical defects in the final metal products if not removed prior to solidification.

In order to most efficiently use the filter media, the open porosity of the filter must be completely filled with liquid metal. Completely filing the filter with liquid metal improves the wetting of the surface of the filter media to facilitate the collection of the solid inclusions. The problem to be solved is that incomplete priming results in locally higher liquid velocities in the active parts of the filter, higher operational pressure drops or lower total liquid metal throughput, combined with lower collection efficiency for the solid inclusions.

A common practice is to place a ceramic foam filter with a gasket material into a filtering device or 'bowl', such that the metal height builds up over the filter and is forced by gravity into and through the filter medium. The inclusions are then removed by either deep or bed filtration mechanisms. The poor wetting characteristics of these ceramic filters and the need to remove the air contained within the pores, often leads to difficulties, particularly at the start of the filtration operation.

The significance of priming in filtration is disclosed in a number of Patents and Patent Applications, such as U.S. Pat. No. 4,872,908, where Enright, P. G. et al. describe the definition and role of priming in detail and also give specific efficiency data when removing 20 micron particles (between −13.4 and 54.8%) using LiMCA for 30 PPI filters The large range in filtration efficiency can be partly attributed to the impact of priming on filter performance. U.S. Pat. No. 4,081,371, Yarwood, J. C. et al. describe the need to remove gas bubbles from within the ceramic foam filter, and the roles of metallostatic head and filter angle on priming. Generally speaking higher total pressure (from metallostatic head or other means) improves priming efficiency. In U.S. patent application Ser. No. 09/867,144, Quackenbush, M. S., disclose a filter media, without the application of mechanical forces to encourage air bubble release, for the purpose of releasing trapped air bubbles to ensure an easier and more complete priming of the filter media.

In U.S. Pat. No. 7,666,248, Belley, L., et al. disclose a method using a vacuum system to generate an additional pressure gradient of about 6 kPa or about 25 cm of liquid aluminum head equivalent for the express purpose of increasing the effective priming pressure to ensure adequate priming for ceramic foam filters with a thickness from 2.5 to 7.6 cm and a low average pore or "window" size of 150-500 microns, which are typical of filters with 60 or more PPI. These filters otherwise require substantial metallostatic heads (vertical distance from trough bottom to filter top) to ensure adequate priming. Belley et al. also disclose that the typical range of priming heads for Ceramic Foam Filters is from about 20-80 cm. Higher values are associated with higher pore density and smaller window sizes, and are often impractical to implement at existing casting operations.

Filters are normally preheated to try to improve the flow of metal into the filter media and, hence, the priming efficiency for a fixed metal height over the filter. Difficulties are often encountered in obtaining uniform heating without localized overheating that can lead to thermal damage of the filter media. This makes it difficult to ensure that the entire filter area will be available to pass liquid metal. In U.S. Pat. No. 4,834,876, Walker, N. G. claims a process by which the non-conductive ceramic filter is rendered electrically conductive by the coating of the filter media particles with a conductive substance like nickel or by using an electrically conductive material, such as silicon carbide to construct the filter media. By passing a current through the media or by surrounding the filter with an induction coil to induce eddy currents, the media could be caused to self-heat due to the resistive ($I^2R$) losses to ensure preheating and complete priming.

A process involving the use of a low frequency induction coil and Ceramic Foam Filter elements has been presented in U.S. Pat. No. 4,837,385 by Calogero, C. et al. In this process a number of different means were presented, whereby a crossed current and magnetic field could be created, which would generate Lorentz forces. Some of these methods involve the use of electrodes and a so-called 'injection current' which is undesirable as the electrodes are a potential source of contamination to the liquid metal being filtered. The theory behind the process disclosed by Calogero et al. was that the Lorentz forces would act preferentially on the metal and not the inclusions, thus causing migration of the inclusions and interception of the inclusions by the walls of the filter media. The impact of the magnetic field on the priming of the filter media was not disclosed. Furthermore, the mechanism described by Calogero depends on the absence of any significant curl or vorticity in the magnetic and Lorentz force fields. However, as disclosed in U.S. Pat. No. 4,909,836, vorticity is always present in these fields when a normal induction coil with a constant helical pitch is used as the source of crossed current and magnetic field. One aspect of the present invention uses an induction coil in order to avoid direct contact and contamination of the liquid metal. A standard constant pitch induction coil is used. The inventors are well aware of the vorticity in the magnetic and Lorentz forces produced via such an induction coil and have therefore designed the method to make maximum advantageous use of the vorticity, in order to press metal into the filter media to achieve a better degree of priming with a low metallostatic head.

DEFINITIONS

As used herein, the term "priming" refers to the displacement of air contained in the open pore structure of a filter (e.g., a ceramic foam filter) and the improvement of wetting of the filter media by the liquid metal, thus, allowing the maximum volume and internal surface area to be available to pass flow and collect particles.

As used herein, the term "inclusion" refers to any contaminant of the liquid metal having a melting point greater than the metal, and therefore being solid at the processing temperature.

SUMMARY OF THE INVENTION

Various aspects of the present invention relate to: (1) a method of priming, without the use of externally applied vacuum or gas pressure, by applying a low frequency induction coil (1-60 Hz) to ensure complete priming of a non-electrically conductive filter element; (2) a method of priming to improve priming and subsequent operation of ceramic foam filters with small 'window' size, such as those typical of 50-80 PPI commercial Ceramic Foam Filters, in order to operate with higher efficiency and produce a metal product containing fewer inclusions; (3) a method of priming which allows thicker than traditional ceramic foam filters or a stack of traditional filters to be primed; and (4) an apparatus that allows filter media including previously used filter media, to be maintained hot or reheated, and subsequently reused for more than one casting cycle.

In one embodiment, the apparatus for priming a filter includes a filter element configured to receive a liquid metal flow; an induction coil surrounding the filter element and configured to produce a magnetic field, an axis of the induction coil being substantially aligned with an introduction direction of the liquid metal flow; a gasket configured to provide a secure enclosure to a circumference of the filter element; and a separator accommodating the induction coil and separating the induction coil from the liquid metal flow.

In one embodiment, a low frequency induction coil is placed around and in very close proximity to a ceramic filter media, such as a Ceramic Foam Filter element or stack of said filter elements. The presence of a magnetic field allows priming of thicker filters than the conventional industry standard of approximately 50 mm. The total allowable thickness is determined by the installed length of the induction coil.

The orientation the coil and filter elements can be either vertical or horizontal, provided a path is made available for gas to escape during priming.

The electrical conductors of the induction coil can have many different shapes. For example, flat round, tubular, rectangular, or square. Unlike traditional induction furnace coils, the coils of the present invention need not be constructed for low electrical resistance, as they are not being used as part of a device primarily intended for electrically efficient melting. Thus, a higher current density can be advantageously used (e.g. 50 A/mm$^2$ vs. typical values from 1-10 A/mm$^2$) resulting in proportionately smaller diameter conductors that can provide more turns in a given height of coil, with a corresponding increase in the magnetic field strength. Single, double or more layers of coils can also be used advantageously to achieve even higher magnetic field strengths over the height of the filter media. Induction coils with more than 3 layers can also be used, but with diminishing benefits of additional magnetic field strength.

In one embodiment, the filter media is substantially horizontal, and surrounded by an induction coil. The induction coil is positioned to extend over the upper surface of the filter element, which places the top of the filter within the zone of high longitudinal magnetic flux density. The flux density of the magnetic field is very strong over the complete height of the coil, but dissipates rapidly after the last turn of the coil.

Another aspect of the invention features metal poured onto the filter to at least as high as the top of the coil. In a preferred embodiment, the metal is substantially higher than the top of the coil to prevent the formation of a significant metal meniscus, and to reduce the potential for oxidation of the metal during priming. The magnetic field of the coil induces eddy currents in the metal sitting on the filter media, which interact with the coil's strong magnetic field, to produce powerful Lorentz forces. The depth at which these forces can be produced is enhanced by the use of a low alternating frequency in the coil excitation current. A filter element with a large width will require the use of a lower frequency to achieve similar results to those of a smaller width filter.

The heating efficiency of the coil increases with frequency. In an aspect of the invention, the frequency of the coil excitation current is preferably between 1 and 60 Hz, and more preferably between 50 to 60 Hz. This frequency range provides an optimal combination of stirring and heating. Higher frequencies can optionally be used if a greater degree of heating is required to re-melt metal frozen in previously used filter media. In a preferred embodiment, the radius of a round filter or the width of a rectangular or square filter is selected, such that the standard electrical line frequency of 50 or 60 Hz can be utilized to provide an optimal beneficial effect.

The coil and filter apparatus can be round, square or rectangular in section without deviating from the purpose of this invention. A rectangular shape has the advantage that the overall filter area can be maximized, while minimizing the width that the magnetic field must be made to penetrate. A rectangular shape can eliminate the need to use frequencies below the line frequency (50 or 60 Hz), where costly solid state power supplies become necessary.

The Lorentz forces are initially produced only in the metal and not in the non-electrically conductive filter media. Therefore, a large initial vorticity exists in the Lorentz force field, which causes rotation of the metal and impingement onto the surface of the filter element. It is the momentum of the impinging metal that forces metal into the filter.

The inventors have found that within the filter media, current flow is inhibited to a surprising degree by the presence of the ceramic matrix. As a result, less current flows within the filter than in the metal over or under the filter, thus reducing the magnitude of the Lorentz forces. The reduced effective electrical conductivity in the filter ensures that a substantial vorticity in the Lorentz forces continues to exist up to and past the point of complete filter priming. The result is that metal is forced into and through the filter media. Higher pore density filters, e.g. 50 and 80 PPI, have increased resistivity, which increases the vorticity in the Lorentz forces and provides the increased driving forces to prime these 'tighter' filter elements.

If the filter media is not preheated, liquid metal will initially freeze on the surface of the filter media. Given that solid metal has a substantially higher electrical conductivity than the liquid metal at the same temperature (approximately a factor of two for aluminum), the solid will preferentially conduct current, while at the same time being impinged upon by fast flowing liquid metal. Being forced to remain stationary and within the height of the inductor, it will experience continuous heating until it liquefies. In a preferred embodiment, the filter element is preheated by conventional means to reduce thermal stresses in order to prevent cracking. However, preheating is not a requirement for priming, even for very tight 80 PPI filter elements.

Once the filter media is substantially filled with metal, the excitation of the coil can be stopped. Thereafter, conventional casting procedures can be used. On completion of the batch casting process, it is typical to dispose of the filter media because it is difficult to reuse in the absence of continuous metal flow.

In another embodiment of the invention, a used filter element can be reused until its capacity to remove inclusions is completely exhausted. A used filter element can be reused by applying a period of inductive heating prior to priming with liquid metal or by maintaining the filter filled with liquid metal between casts by using continuous induction heating. In one aspect, an excitation current higher than 60 Hz is advantageously used. This embodiment utilizes a dual frequency power supply, which could optionally be combined with a second coil specifically designed for the melting operation.

REFERENCES

| 3,893,917 | July 1975 | Pror et al. | 210/69 |
| 4,081,371 | March 1978 | Yarwood et al. | 210/69 |
| 4,834,876 | May 1989 | Walker | 210/185 |
| 4,837,385 | June 1989 | Conti et al. | 210/695 |
| 4,872,908 | October 1989 | Enright et al. | 75/68 |
| 7,666,248 | February 2010 | Belley et al. | 75/407 |
| 09/867,144 | December 2002 | Quackenbush | 210/510.1 |
| 4,909,836 | March 1990 | El-Kaddah | 75/10.67 |

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

For purposes of promoting an understanding of the principles of the invention, reference will now be made to the embodiments illustrated in the drawings. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Figure 1:
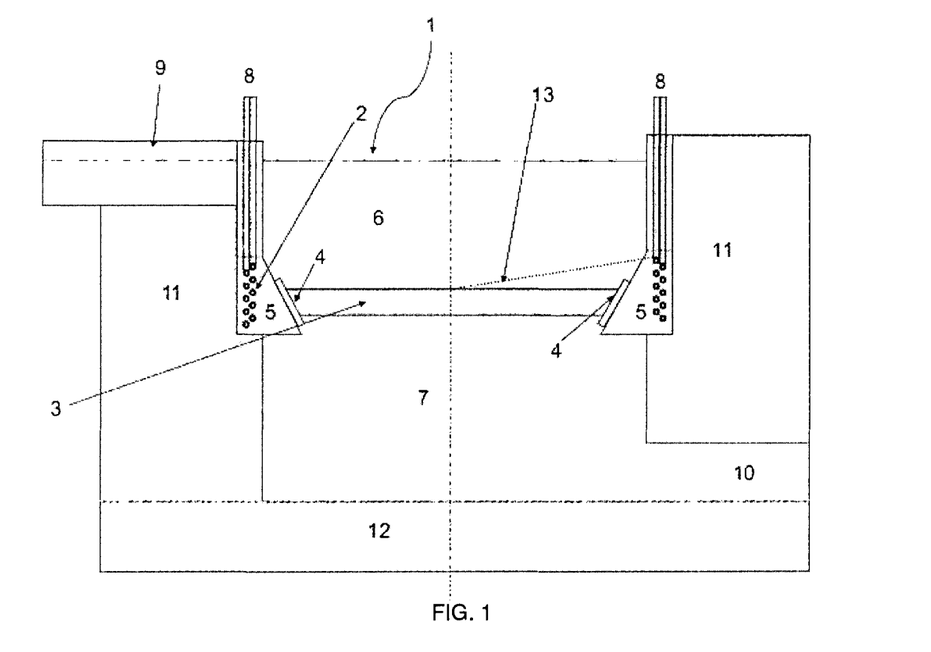
FIG. 1 is a schematic drawing of one embodiment of the present invention.

FIG. 1 shows a conventional filter 'bowl' 1 as typically used with Ceramic Foam Filters. FIG. 1 is suitably modified in accordance with the present invention to include an induction coil 2. A two layer induction coil 2 is shown in FIG. 1. A single, double or more layer coil could also be used without changing the purpose of the invention.

A standard Ceramic Foam Filter element 3 is shown installed within the induction coil 2. Alternatively, two or more filter elements could be stacked without deviating from the purpose of the present invention, provided that the coil 2 extends above the upper surface of the top of filter 3 by one coil turn or at least 5% and preferably 10% of the coil radius, as indicated by dotted line 13 in FIG. 1.

The induction coil 2 is preferably placed as close as possible to the edge of filter 3 to achieve the most advantageous results of the magnetic field. Suitable space must be allowed for gasket material 4 to prevent leakage of the liquid metal around the filter 3 and for thermal insulation made from refractory material 5. Sufficient refractory material must be present to avoid the contact of the hot metal in the upper portion of the bowl 6 or discharge portion of the bowl 7, with coil 2 or with the coil leads 8. Those skilled in the art understand that a suitable cooling media (organic or water) must be used in combination with coil leads 8 and coil 2, to prevent electrical or thermal overheating and damage to the electrical conductors. Contact must be prevented between the coil leads 8 and between the layers of the coil 2 to prevent electrical short circuiting of the excitation current.

In order to function as a filtration device, the bowl must be equipped with a suitable liquid metal feed 9 and discharge means 10. The sides 11 and bottom 12 of the bowl must be designed with adequate refractory to maintain the heat balance of the metal to be filtered. The filter 3 may be preheated by conventional means to prevent excessive thermal shock prior to use.

In a preferred embodiment of the invention, a current is impressed on the induction coil of sufficient magnitude to generate an average magnetic flux density of 0.05-0.25 T, across the width of the un-primed filter. The frequency of the coil excitation current is preferably between 1 and 60 Hz. The frequency of the coil excitation current is preferably in a range where the ratio between the electromagnetic penetration depth ($\delta$) in the liquid metal in the upper portion of the bowl 6 and the average radius or width of the filter 3 is between preferably 0.5 and 3.0, and more preferably between 0.7 and 1.4, in order to achieve both a sufficiently high magnetic penetration and avoid excessive heating.

In one preferred embodiment, liquid metal is added to the upper part of the bowl 6 via inlet 9 with current applied to coil 2. Alternatively, liquid metal is added first, and then current is applied to coil 2. In a preferred embodiment, liquid metal fills the upper portion of bowl 6 to a sufficient height over the last turn of coil 2, such that an electromagnetic meniscus is prevented from forming. This embodiment also avoids excessive oxidation of the metal during priming.

Electromagnetic priming can be accomplished with minimal liquid metal over the upper surface of the filter. Preferably, a liquid metal height of about 5-10 cm is over the top turn of the coil 2. Alternatively, metallostatic pressures from about 1.1 to 3.6 kPa is preferred to achieve adequate priming of CFF filters between 30 and 80 PPI, while avoiding excessive meniscus formation, and using average magnetic flux densities in the range of 0.1-0.2 T in the space between coil and filter.

In one aspect of the invention, current is continued for periods of time from about 30 seconds to about 10 minutes, and even more preferably to about 3-6 minutes. Once adequate priming has been achieved, the excitation current to the coil 2 can be discontinued.

Once a filter element 3 has been used, it can optionally be reused by first using induction coil 2 to re-melt the metal frozen in the pores of the filter 3. Those skilled in the art understand that a higher frequency is advantageous for melting. A frequency >60 Hz can be applied. A dual frequency power supply may therefore be beneficially used with the present method. A skilled practitioner may specify the frequency, current and time in order to achieve the desired melting in the correct amount of time, without significant overheating and possible damage to the filter elements, while achieving a high electrical efficiency. A second coil can optionally be designed and installed coaxially to coil 2 to achieve even more energy efficient melting.

The present invention can be better understood with reference to specific examples. These examples are illustrative and are not intended to restrict the applicability of the present invention. These examples were conducted using several different coils as indicated in TABLE I. These coils were operated at 50 Hz using applied currents as indicated in the various examples.

TABLE I

| Coils: | Coil 1 | Coil 2 | Coil 3 |
|---|---|---|---|
| Number of layers | 2 | 1 | 2 |
| Inside diameter, mm | 126 | 126 | 127 |
| Average diameter, mm | 140 | 132 | 142 |
| Height, mm | 107 | 111 | 116 |
| Coil copper tube diameter, mm | 6 | 6 | 6 |
| Coil copper tube thickness, mm | 1 | 1 | 1 |
| Number of turns | 31.0 | 16.5 | 31.0 |
| Measured inductance of empty coil, μH | 103.3 | 27.6 | 101.5 |

Figure 2:
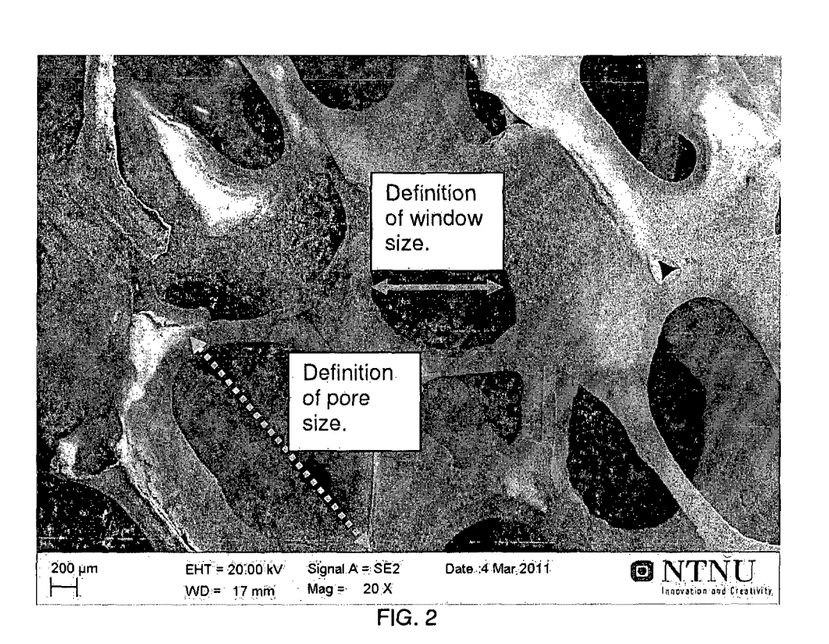
FIG. 2 is a Scanning Electron Microscope picture showing the relatively open structure of a new 30 PPI Ceramic Foam Filter.
Figure 3:
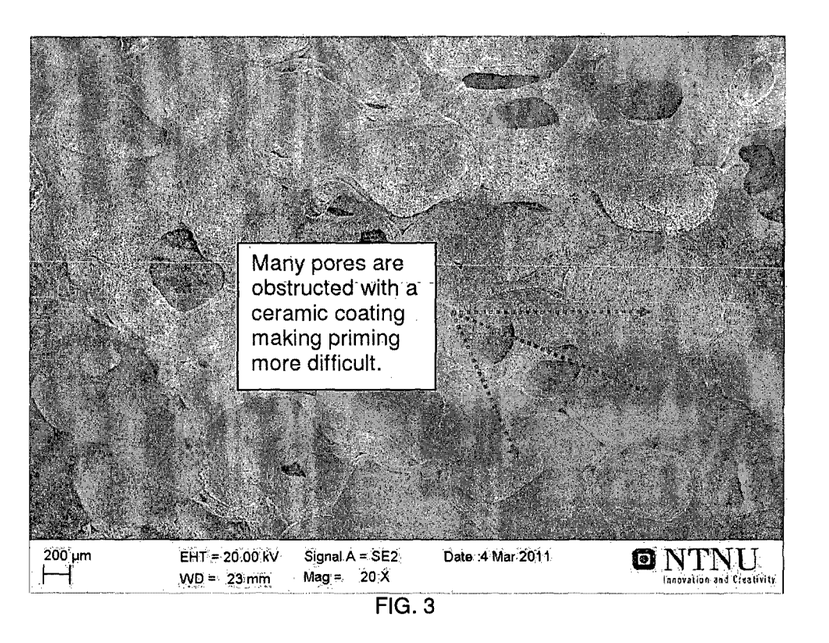
FIG. 3 is a Scanning Electron Microscope picture showing the relatively closed structure perpendicular to the normal direction of metal flow of a new 80 PPI Ceramic Foam Filter.

Nominal filter dimensions of 100-105 mm diameter and 50 mm thick where used in these examples. 30, 50 and 80 PPI commercial Ceramic Foam Filter (CFF) elements were used. SEM pictures of 30 and 80 PPI commercial CFF's are shown in FIGS. 2 and 3. It can be clearly seen in these figures that the 30 PPI has a very open structure, while the pore and window size of the 80 PPI is much reduced. The open structure of the 30 PPI allows for very easy priming with low metal head and less preheating, but it also makes for reduced filtration efficiency especially for fine inclusions in the liquid metal. It is more difficult to get metal to penetrate and remove the air from the closed and tight structure of the 80 PPI CFF, thus requiring increased priming metal heights, as is well known to those skilled in the art.

A standard aluminum casting alloy, A356 was used in all examples, to which various levels of contaminants were added. 1.5 wt % (EXAMPLES 4-6)-3 wt % (EXAMPLES 1-3) SiC was added, using 13-23 micron SiC particles embedded in a matrix of A356 alloy. In EXAMPLES 1-3, oxide particles were also added by the addition of 20% by weight anodized and lacquered aluminum plates.

Example 1

A laboratory scale filter bowl was created by cementing a nominal 105 mm diameter, 30 PPI CFF into two sections of 150 mm long by 4" diameter fiber insulating crucibles, such that the midline of Coil 1 was coincident with the bottom of the CFF and approximately a single turn of the coil was over the upper surface of the CFF. The bottom of the bowl was constructed from a dense ceramic plate, ~25 mm thick, in which a 3.2 mm diameter discharge hole had been drilled.

Figure 7:
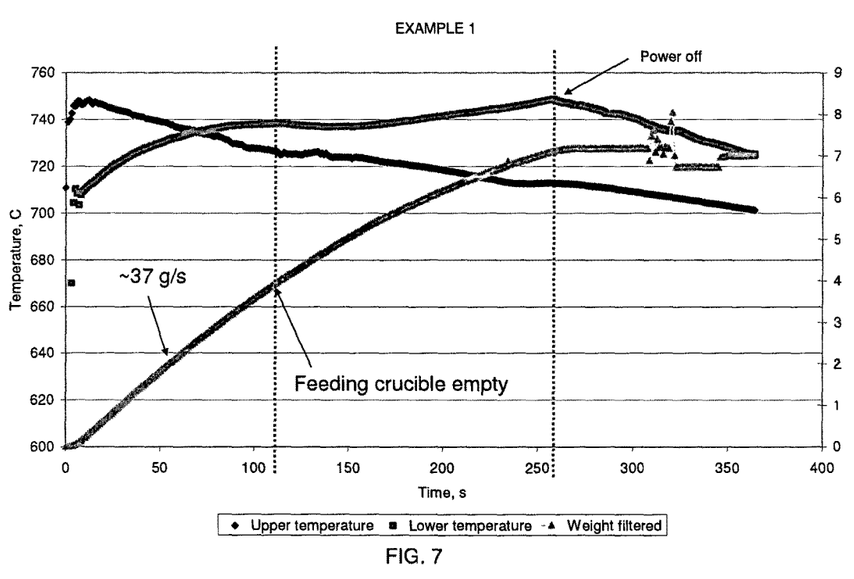
FIG. 7 is a graph showing the data logged data for EXAMPLE 1.

The filter was preheated to a glowing red temperature using a hand held propane burner. An RMS current of 731 A was applied to Coil 1 at 50 Hz. A356 aluminum alloy, containing both SiC and oxide particles and at a nominal initial pouring temperature of 750° C. (as measured by immersion thermocouple seconds before pouring) was added to the upper portion of the bowl up to a level of 100 mm over the top of the CFF. This level was maintained until the feeding crucible was emptied after 110 seconds. Power was interrupted after 260 seconds, when aluminum was no longer discharging from the outlet hole. The measured temperature over and under the filter and the discharge rate of the aluminum were data logged as indicated in FIG. 7. The heating effect of the induction coil is clearly illustrated in FIG. 13, with the lower temperature rising with time, even as the temperature of the metal over the filter decreases. Average coil current during filtration was 715 A, due to the increased electrical resistance caused by the liquid metal. This effect is present in all examples and well known to those skilled in the art.

Figure 4:
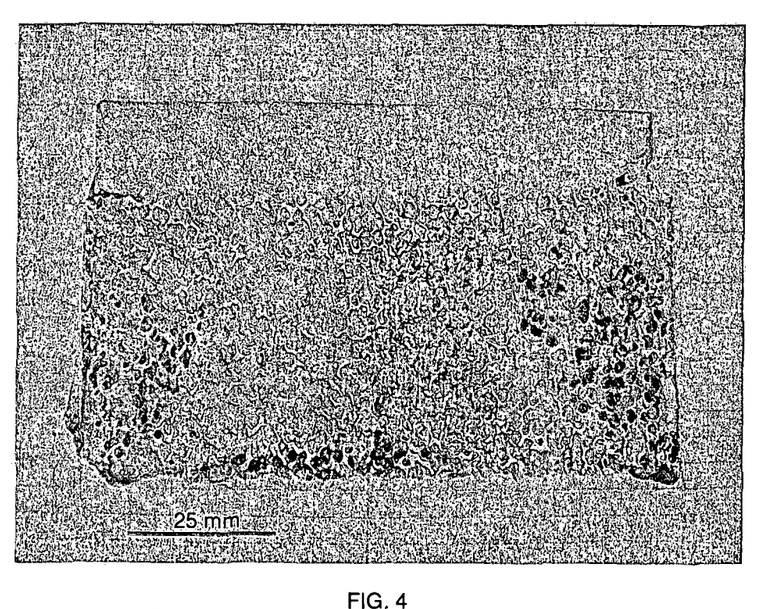
FIG. 4 depicts a photograph of a non-limiting example of priming a 30 PPI ceramic filter in accordance with an embodiment of the present invention.

The filter was subsequently sectioned using abrasive water cutting, due to the high concentration of extremely hard and abrasive SiC particles. One section is shown as FIG. 4. Areas containing high gas porosity and exhibiting poor metal-ceramic wetting were ablated during the cutting process. In this example where the filter was primed with a 'strong' magnetic field, very little material was ablated and good wetting was observed macroscopically as well as microscopically during subsequent metallographic analysis with a scanning electron microscope.

Example 2

Figure 5:
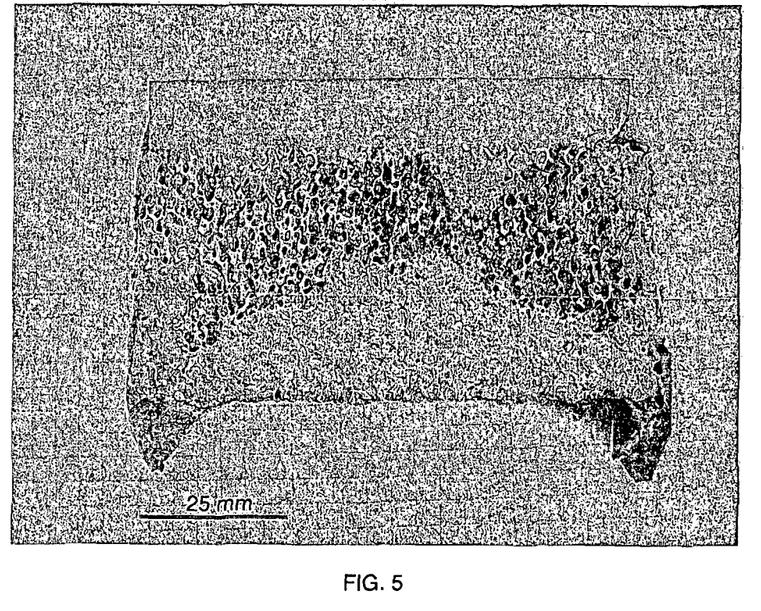
FIG. 5 depicts a photograph of a non-limiting example of priming a 30 PPI ceramic filter in accordance with an embodiment of the present invention.
Figure 8:
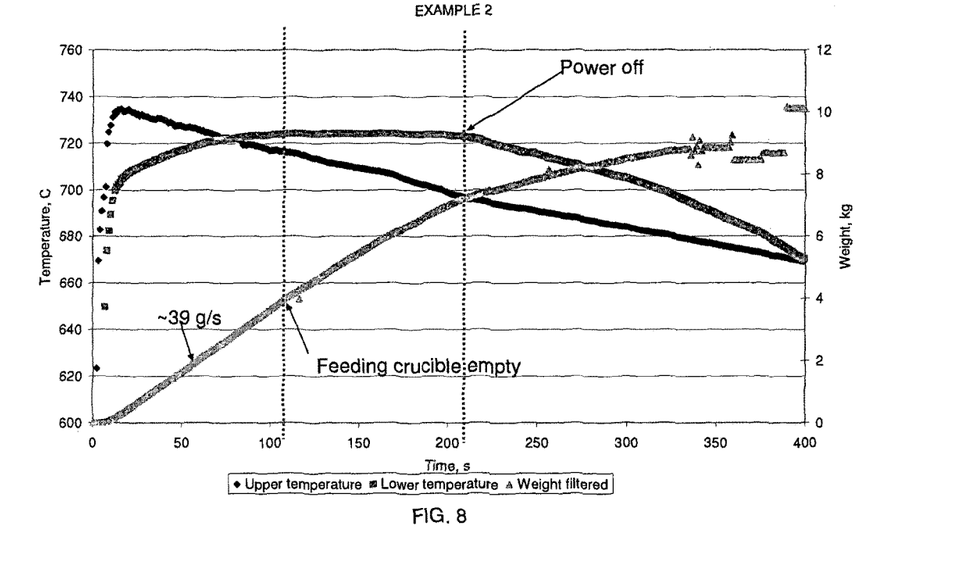
FIG. 8 is a graph showing the data logged data for EXAMPLE 2.

An apparatus was constructed using Coil 2, but otherwise identical to EXAMPLE 1. The filter was similarly preheated. An RMS current of 956 A was applied to Coil 2. The same recipe of alloy, SIC and oxide was added, at a nominal pouring temperature of 750° C. The temperature over and under the filter and the discharge rate of the aluminum were again measured as shown in FIG. 8. The feeding crucible was emptied after 110 seconds and the power was interrupted after 215 seconds. This filter element, which had been primed with a 'weak' magnetic field, was again cut using water abrasive cutting and in this case much greater porosity and less wetting of the ceramic was observed as indicated by the loss of ceramic material during cutting shown clearly in FIG. 5.

Example 3

Figure 6:
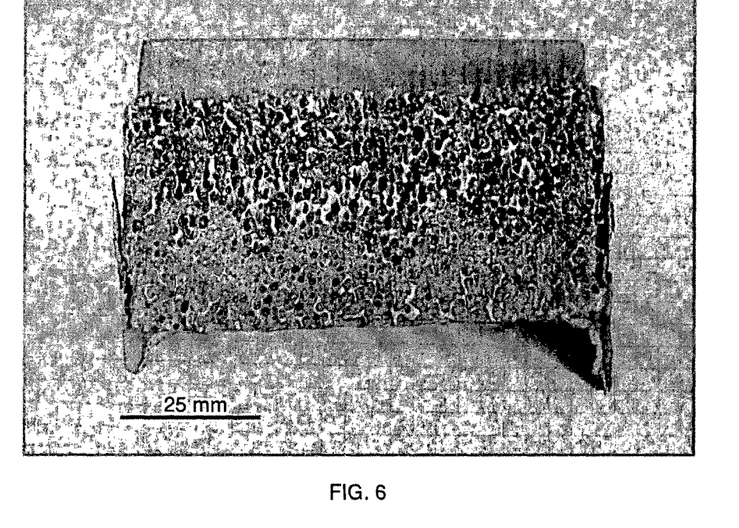
FIG. 6 depicts a photograph of incomplete priming of a 30 PPI ceramic filter without the presence of an induction coil.
Figure 9:
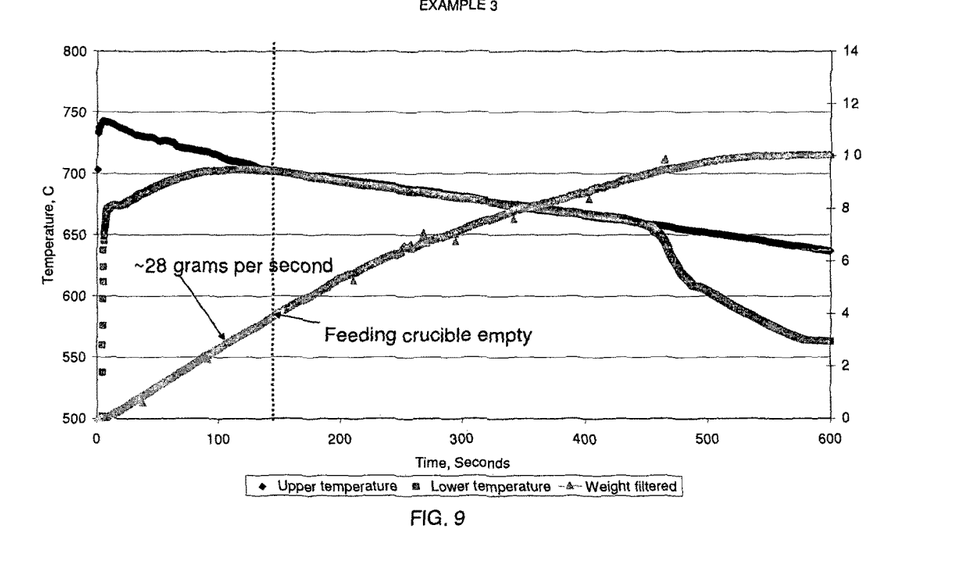
FIG. 9 is a graph showing the data logged data for EXAMPLE 3.

An apparatus was constructed without an induction coil, but otherwise identical to EXAMPLES 1 and 2. The filter was preheated till glowing red and again the same feed recipe and target pouring temperatures were used. The level of priming metal was maintained at 100 mm over the filter element for 145 seconds until the feeding crucible was emptied. The temperature over, under and the discharge rate of the aluminum were again measured as shown in FIG. 9. One section of the filter element is pictured in FIG. 6, showing the very high porosity and very poor wetting of the filter element, when compared to FIGS. 4 and 5 from EXAMPLES 1 and 2. The poor priming of the filter is also indicated by the reduced discharge rate of the metal for the same metallostatic head over the filter and the same size of the discharge orifice. Priming results were best with the 'strong' field, less good with the 'weak' field and poorest with no magnetic field.

Example 4

Figure 10:
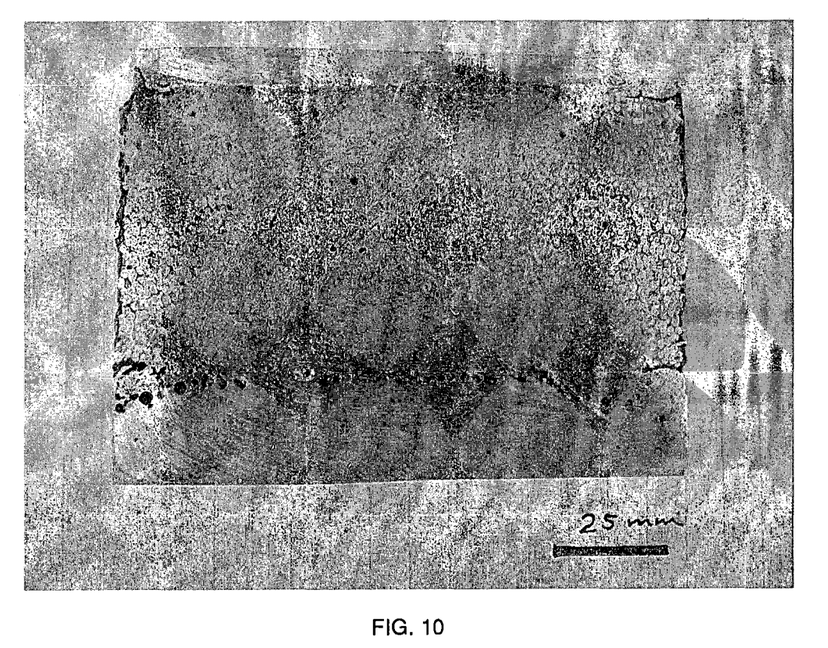
FIG. 10 depicts a photograph of a non-limiting example of priming a 50 PPI CFF in accordance with an embodiment of the present invention.

An apparatus similar to EXAMPLES 1-3 was constructed, but without a discharge hole in the bottom plate. Coil number 3 was used. A 50 PPI commercial Ceramic Foam Filter (CFF), 100 mm in diameter was placed such that the bottom of the filter was at the same elevation as the midline of the coil and the coil extended approximately one turn above the upper surface of the 50 mm thick filter. A feed consisting of A356 aluminum alloy and 1.5 wt % SiC was used. The filter was not preheated. The upper portion of the filter bowl was filled with the liquid aluminum feed material at a nominal pouring temperature of 750° C., up to a level of 100 mm over the upper surface of the filter element. An excitation current of 738 A was then applied to the coil. Over approximately 20 seconds, metal was drawn into the filter and metal was added to maintain a nearly constant height of 100 mm over the filter (104 mm measured after freezing). Current was maintained for precisely 180 seconds. The power was then stopped and the sample solidified. The filter element was then sectioned using a steel blade. The polished section is shown in FIG. 10, showing very low porosity and complete metal penetration of the filter element.

Example 5

Figure 11:
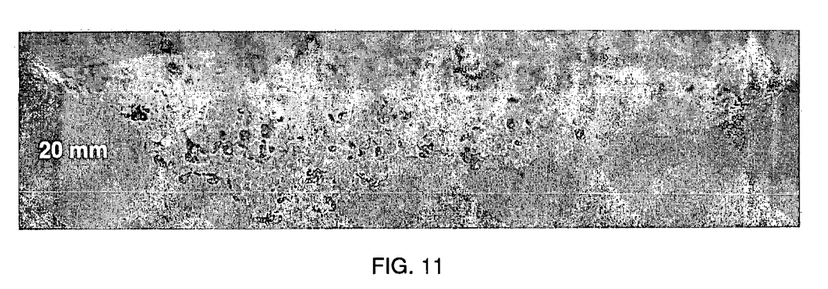
FIG. 11 depicts a photograph of negligible priming of a 50 PPI CFF without the presence of an induction coil.

An apparatus substantially identical to EXAMPLE 4 was constructed, but without an induction coil. The same feed recipe and filling procedure were used. Again no preheating of the filter element was applied. After filling to 100 mm over the top of the CFF, no decrease in metal height was observed. On disassembly of the apparatus the filter element separated from the 100 mm of metal, which was frozen over the filter and it was observed that only a very minor amount of metal penetration had occurred (<20 mm) as shown in FIG. 11. The balance of the filter media was completely devoid of metal and priming had therefore failed. The difference in the results between EXAMPLES 4 and 5 were dramatic, with the only substantial difference in execution being a 'strong' magnetic field in the case of EXAMPLE 4 and no magnetic field in EXAMPLE 5.

Example 6

Figure 12:
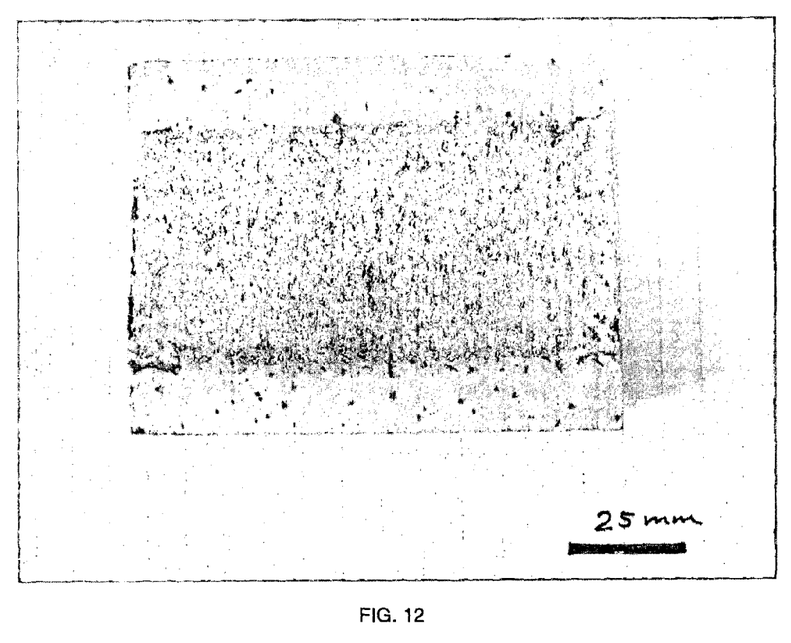
FIG. 12 depicts a photograph of a non-limiting example of priming an 80 PPI CFF in accordance with an embodiment of the present invention.

An apparatus substantially identical to EXAMPLES 4 and 5 was constructed, but using an 80 PPI, instead of a 50 PPI CFF. The same procedures and feed recipe from EXAMPLE 4 were used. After filling with liquid alloy to 100 mm over the top of the filter, an excitation current of 747 A was applied to coil 3. Over a period of approximately 30-40 seconds, metal was drawn into the filter element and metal was added over the filter to maintain a level of 100 mm (99 mm measured after freezing). Current was maintained again for precisely 180 seconds. The power was then stopped and the sample solidified. This filter element was then cut using water abrasive cutting. Priming was extremely successful as indicated by the complete metal penetration, low gas porosity and good wetting shown in FIG. 12.

Example 7

Figure 13:
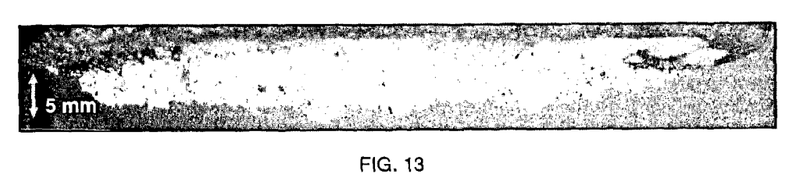
FIG. 13 is a photograph showing negligible priming of an 80 PPI CFF without the presence of an induction coil.

An apparatus substantially identical to EXAMPLE 6 was constructed, but without an induction coil. The same filling procedures and feed recipe were again used. Liquid aluminum alloy containing the SiC particles was added over the 80 PPI filter element up to a height of approximately 100 mm. No decrease in the metal height was detected. The sample was then solidified. On disassembly, the metal which extended 103 mm over the top of the filter element, separated from the balance of the filter, which was completely free of metal. Approximately 0-5 mm of filter material remained attached to the frozen metal, as shown in FIG. 13. It was concluded that priming had completely failed. Again the only substantive difference between EXAMPLE 6 and 7 was that a 'strong' magnetic field had been used in EXAMPLE 6 and no magnetic field was applied in EXAMPLE 7.

The presence of the strong magnetic field in EXAMPLES 4 and 6 was responsible for the good priming even in the absence of filter preheating. The lack of magnetic fields, combined with no preheating and the low metallostatic height over the filters in EXAMPLES 5 and 7 resulted in a failure to prime.

It should be understood that the examples and embodiments described herein are for illustrative purposes only and that various modifications or changes in light thereof will be suggested to persons skilled in the art and are to be included within the spirit and purview of this application and the scope of the appended claims.

What is claimed is:
1. A method of priming a non-electrically conductive ceramic filter element for removal of solid inclusions from liquid metal, wherein said filter element is contained in a filter bowl, and is surrounded by an induction coil whose axis is substantially aligned with the direction of a desired net metal flow, said method comprising:
   a) applying an alternating excitation current to the induction coil;
   b) adding sufficient liquid metal to cover an upstream side of the filter element;
   c) allowing the currents induced in the liquid metal by the induction coil and magnetic field of the induction coil to create Lorentz forces which press upon and stir the liquid metal such that the liquid metal is pressed into the ceramic, hence priming the filter element; and
   d) discontinuing the excitation current once a predetermined degree of priming has been obtained.
2. The method according to claim 1, wherein the design of the induction coil and magnitude of the applied current generate an average magnetic field strength of at least 0.05 T in a space between the induction coil and ceramic filter.

3. The method according to claim 1, wherein an average field strength is between 0.05 and 0.25 T in a space between the induction coil and ceramic filter.

4. The method according to claim 1, wherein an average field strength is between 0.1 and 0.2 T in a space between the induction coil and ceramic filter.

5. The method according to claim 1, wherein the liquid metal is an aluminum alloy.

6. The method according to claim 1, wherein the liquid metal is first added to the filter bowl and then current is applied to the induction coil.

7. The method according to claim 1, wherein the non-electrically conductive ceramic filter is a ceramic foam filter of between 30 and 80 PPI and 25-75 mm of thickness.

8. The method according to claim 1, wherein 2 or more ceramic foam filters are combined to a total thickness of 50-150 mm.

9. The method according to claim 1, wherein the induction coil extends at least one turn and between 5 and 10% of the radius of the induction coil, but less than half of a total length of the induction coil, over the upper surface of the top of the filter element.

10. The method according to claim 1, wherein the metal extends between 5 and 15 cm over the top of the induction coil.

11. The method according to claim 1, wherein a frequency applied to the induction coil is between 1-60 Hz.

12. The method according to claim 11, wherein the frequency of the induction coil is selected to give a ratio of electromagnetic penetration depth to the average radius or width of the filter between 0.5 and 3.0.

13. The method according to claim 11, wherein local electrical line frequency can be used by adjusting the width or diameter of the filter element to achieve the preferred ratios.

14. The method of reusing a previously used ceramic filter element, comprised of applying an alternating current to the induction coil in claim 1 at a frequency greater than 50 Hz, wherein there is sufficient current to inductively melt the solid aluminum contained in the pores of the filter element.

15. The method according to claim 14, wherein a second coil specifically designed for high efficiency melting is installed co-axially with the mixing coil.

16. The method according to claim 1, wherein the frequency of the induction coil is selected to give a ratio of electromagnetic penetration depth to the average radius or width of the filter between 0.7 and 1.4.

17. An apparatus for priming a filter, comprising:
a filter element configured to receive a liquid metal flow;
an induction coil surrounding the filter element and configured to produce a magnetic field, an axis of the induction coil being substantially aligned with an introduction direction of the liquid metal flow;
a gasket configured to provide a secure enclosure to a circumference of the filter element; and
a separator enclosing the induction coil and in contact with the liquid metal flow.

18. The apparatus according to claim 17, wherein the induction coil extends, along the axis, above an upper surface, facing the liquid metal flow, of the filter element.

19. The apparatus according to claim 17, wherein the induction coil is a single layer coil or multi-layer coil.

20. The apparatus according to claim 17, further comprising a liquid metal feed configured to lead the liquid metal feed to the filter element and a discharge device.

21. The apparatus according to claim 17, further comprising a preheating device configured to preheat the filter element prior to introducing the liquid metal flow.

22. The apparatus according to claim 17, wherein the filter element is non-electrically conductive.

23. The apparatus according to claim 17, wherein the filter element comprises ceramic.

* * * * *